United States Patent [19]

Howell

[11] Patent Number: 5,073,115

[45] Date of Patent: Dec. 17, 1991

[54] TEACHING - PHOTOGRAPHIC TANK

[76] Inventor: William M. Howell, 2200 Vesthaven Way, Birmingham, Ala. 35216

[21] Appl. No.: 609,642

[22] Filed: Nov. 6, 1990

[51] Int. Cl.⁵ .......................................... G09B 23/36
[52] U.S. Cl. ........................................ 434/297; 119/5
[58] Field of Search ...................... 434/295, 296, 297; 119/5

[56] References Cited

U.S. PATENT DOCUMENTS

| D. 41,977 | 12/1911 | Jacob | 119/5 X |
|---|---|---|---|
| 681,110 | 8/1901 | Denton | 434/297 |
| 2,205,686 | 6/1940 | Ehrlich | 119/5 |
| 3,269,578 | 3/1964 | Lewis | 434/297 X |
| 3,512,503 | 5/1970 | Willinger | 119/5 |
| 3,664,301 | 5/1972 | Morrill | 119/5 |
| 4,531,477 | 7/1950 | Crossman | 119/5 |

FOREIGN PATENT DOCUMENTS

| 0948936 | 7/1972 | Canada | 119/5 |
|---|---|---|---|
| 0003534 | 5/1891 | Fed. Rep. of Germany | 119/5 |
| 0854861 | 9/1952 | Fed. Rep. of Germany | 119/5 |
| 3416606 | 11/1985 | Fed. Rep. of Germany | 119/5 |
| 0362868 | 4/1906 | France | 119/5 |
| 2577125 | 8/1986 | France | 119/5 |
| 0423945 | 2/1935 | United Kingdom | 119/5 |
| 1322862 | 7/1973 | United Kingdom | 119/5 |

*Primary Examiner*—Richard J. Apley
*Assistant Examiner*—L. Thomas
*Attorney, Agent, or Firm*—Jennings, Carter, Thompson & Veal

[57] ABSTRACT

An apparatus to be used in field studies of varying fish populations allowing visual display and photographing of live specimens without the excessive handling or undue stress normally accompanying such examination. The apparatus is made of a substantially rigid transparent material in the form of a V-shaped or W-shaped tank. This design allows a specimen to be wedged into position between converging viewing plates without exerting undue pressure to the specimen's body. The tank includes side plates which are fused with the viewing plates with a non-toxic adhesive material allowing the tank to be filled with water. A base plate is attached to the bottom of the V-shaped tank so that it may stand on its own. The W-shaped tank does not include a base plate so that all three troughs may be utilized.

20 Claims, 2 Drawing Sheets

TEACHING - PHOTOGRAPHIC TANK

FIELD OF THE INVENTION

The present invention relates to an article to be used for immobilizing a living fish. More particularly, the present apparatus relates to a tank which may be used to immobilize fish for short periods of time for visual display and photography without causing damage to the fish.

BACKGROUND OF THE INVENTION

Due to the increasing industrial and domestic pollution experienced in our waterways over the past few years, a sharp decline has been observed in various fish populations. With this decline has come the reevaluation of the necessity for killing and preserving specimens for classroom studies.

The current method utilized by high schools, colleges and universities to study various types of fish involves obtaining specimens from their natural habitat and placing them in a fixative such as formalin resulting in the death of the specimen. This method is necessary to point out identifying characteristics and to eliminate the difficulty often accompanying the handling of live specimens.

Prior attempts to restrain specimens in the field have proven unsuccessful due to the inability to secure the specimens for a period of time without causing substantial harm. Extensive handling often results in the death of the specimen even when returned to its natural habitat. Use of anesthesia has proven undesirable due to the effects of the anesthesia on the specimens. Securing the specimens is further hindered by the size of the specimens and the slick nature of their skin. In addition, holding of the specimens also interferes with the viewing of the overall characteristics thereof.

Although tanks have been used for restraining fish, they differ substantially from the present invention both in appearance and in function. These tanks consist of a glass plate that may be inserted into a flat-bottomed tank and then pulled forward to trap the fish against the front panel of the tank. Unlike in the present invention, external pressure is exerted on the body of the fish which creates the danger of crushing the fish. The design of the prior tanks also makes it difficult to position the fish in a restrained posture.

While preservation of the specimens allows students to better manipulate the specimens and observe the characteristics of each, such practices do nothing to help preserve the fish population. Although it is arguable that field exercises might be eliminated in favor of classroom study, most feel that the combination of the two teaching methodologies is essential to optimize instructional effectiveness. As a result each year numerous specimens are sacrificed in an attempt to educate students. Typically the specimens are discarded to make room for other specimens to be collected at a later date. This repeated process is normally justified by the fact that preserved specimens tend to fade in appearance thereby making color markings difficult to distinguish.

Therefore, the present invention presents a marked improvement in the manner in which studies of the fish population may be conducted by returning each specimen to its habitat after examination without injury.

SUMMARY OF THE INVENTION

It is the principal object of the present invention to provide an apparatus for immobilizing fish for observation in field studies without causing damage.

It is a further object of the present invention to provide an apparatus which will allow photographs to be taken of live fish thereby eliminating the necessity of sacrificing such specimens.

These objects are accomplished through the use of a holding tank which is V-shaped. The ends of two converging viewing members are affixed to end plates in order to form the tank. These plates are attached to a base plate. These objects may also be accomplished through the use of a W-shaped holding tank wherein two pairs of converging viewing members are integrally connected and affixed to end plates. Tanks with varying angles may be made to accommodate specimens of differing sizes. The W-shaped tank provides a variety of angles within one article thereby increasing the assortment of specimen sizes which may be secured therein for inspection. The use of the V-shape or W-shape allows a specimen to be placed in the tank and wedged between the junction of the two viewing members thereby restraining the fish in one position facilitating examination without struggle or undue stress.

The transparency of the apparatus allows for close examination of the characteristics of the specimen without the need for extensive manipulation. The transparency also allows for photography of the fish. Once examination is completed, the apparatus is merely inverted, returning the specimen to its natural habitat unharmed. The advantage of this procedure is that a large number of specimens may be captured and examined without having to sacrifice them. This allows for study of variations between species of a particular strain of fish.

BRIEF DESCRIPTION OF THE DRAWINGS

Article embodying features of my invention are illustrated in the accompanying drawings which form a portion of this disclosure and wherein.

DESCRIPTION OF THE PREFERRED EMBODIMENT

Figure 1:
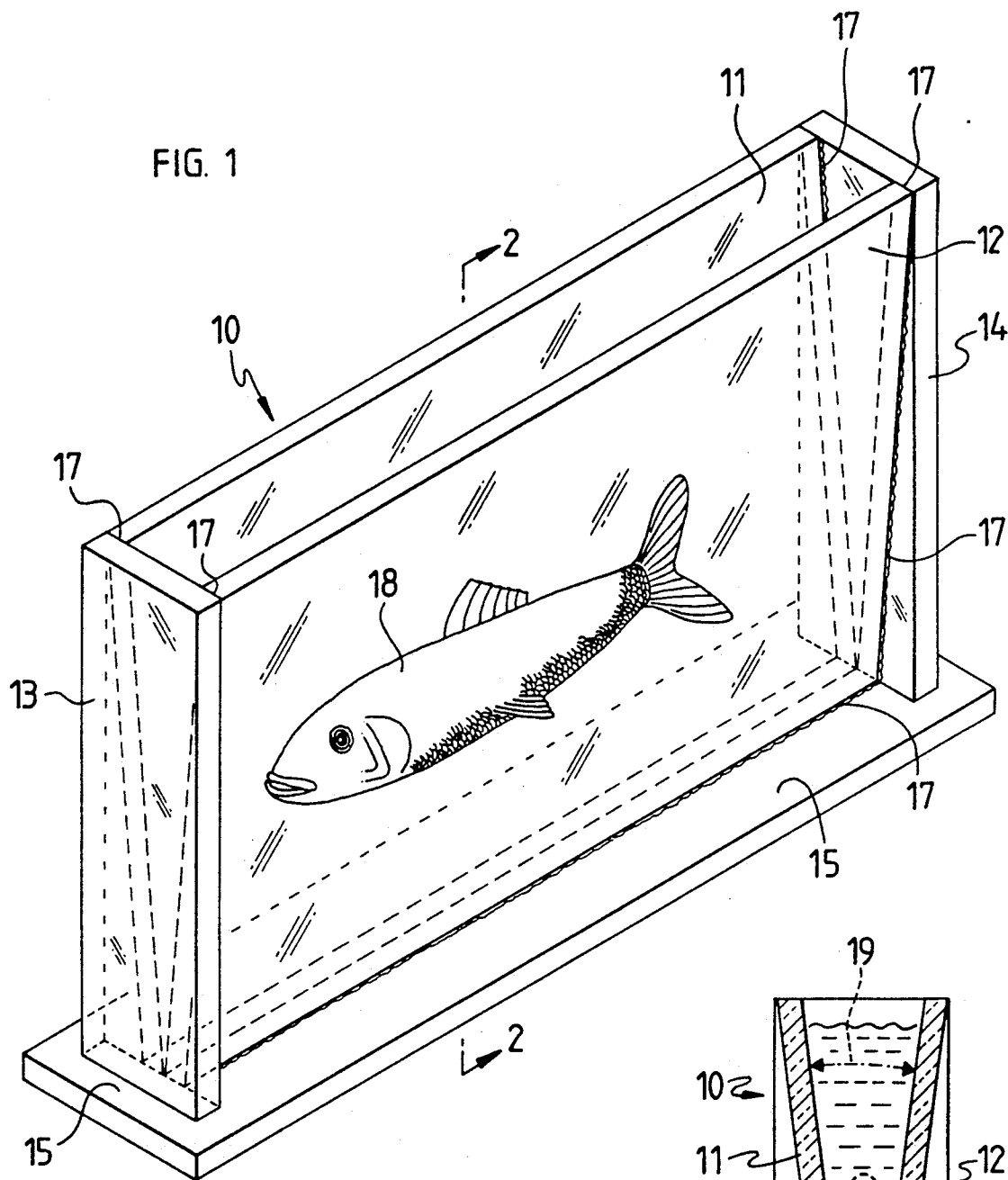
FIG. 1 is a perspective view of the teaching/photographic tank.

Referring to the drawings for a clearer understanding of the invention, it should be noted that the present invention's contemplated use is for restraining fish for visual display and photography. This instrument is in the shape of a wedged or V-shaped tank 10 made of a substantially rigid, transparent material such as plexiglass. As shown in FIG. 1, this wedge shaped tank includes two convergent planar viewing members 11 and 12 which are attached to two end members 13 and 14. These members are then secured to a base member 15 which supports the tank in an upright position.

The preferred method for securing the members in place is through the use of a non-toxic adhesive material. One recommended adhesive material is methylene chloride acrylic solvent. This adhesive material may be injected along the joints 17 between the members with a glass syringe and metal needle. Capillary action causes the adhesive material to move into the joints and bond the members together. Care should be exercised in applying the adhesive material in order to make sure that a continuous watertight bond is formed. It may be noted that the members may be affixed by other means such as framing or fusing.

Figure 2:
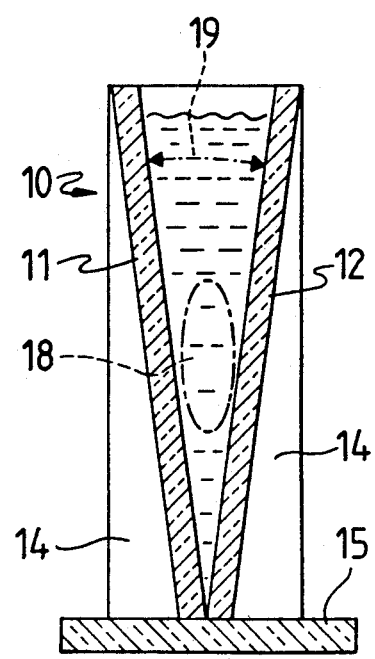
FIG. 2 is a sectional view taken along line 2—2 of FIG. 1.

As indicated by FIG. 2, wherein 18 depicts the specimen, the angle 19 between the converging planar viewing members allows the specimen to wedge itself between the two plates without causing damage to the specimen. As indicated in FIG. 2, upon placing the specimen in the tank, it will settle in the wedge and become immobilized. The shape of the tank prevents the specimen from having excess pressure exerted upon its body since it will settle at the point of the wedge which accommodates the width of the specimen's body.

Following the visual examination and/or photographing, the tank may be inverted allowing the specimen to be returned to its natural habitat without excessive handling and the resultant harm which normally accompanies such handling. The tank may then be cleaned and stored for future use.

Figure 3:
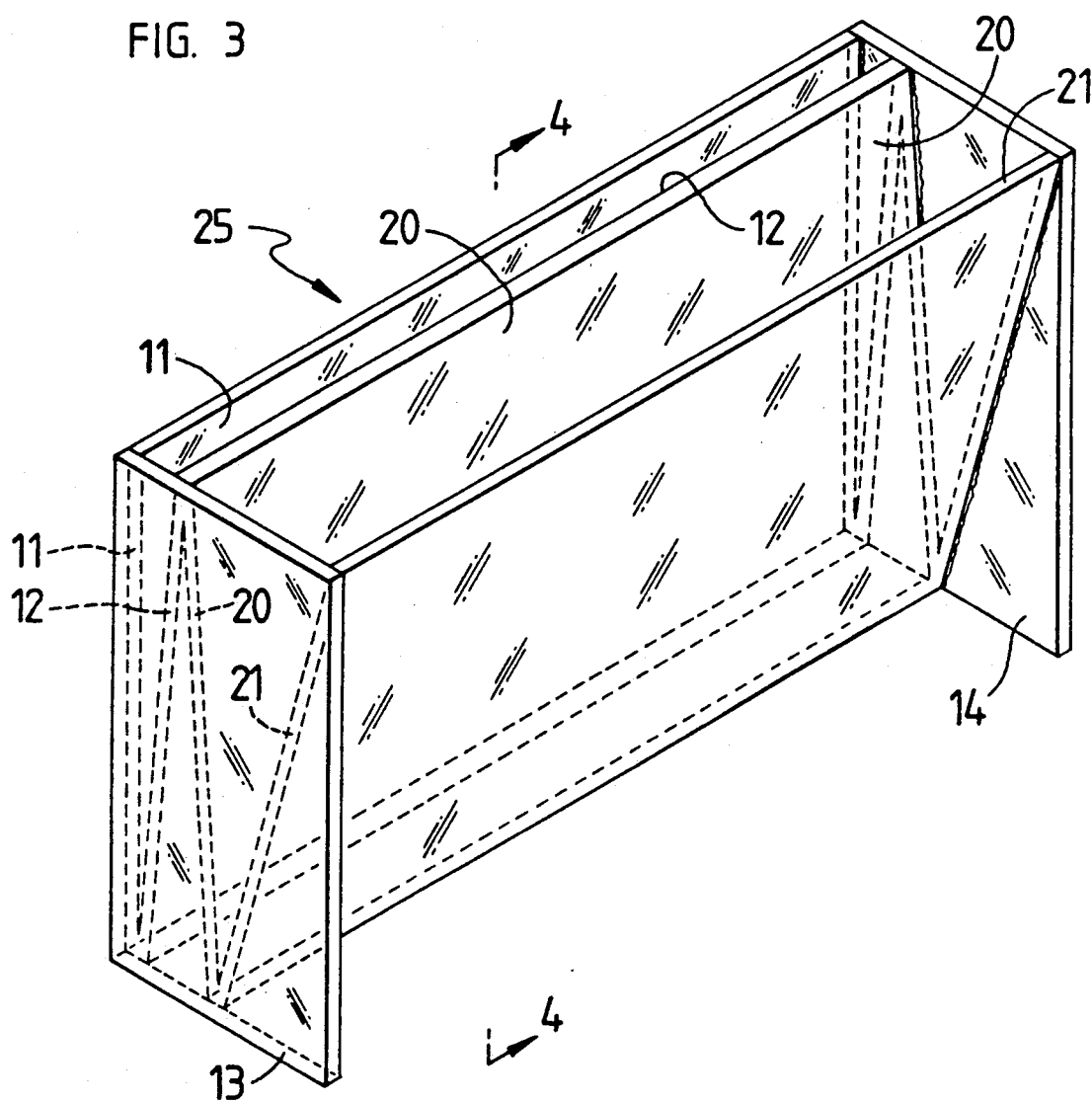
FIG. 3 is a perspective view of a W-shaped teaching/photographic tank.
Figure 4:
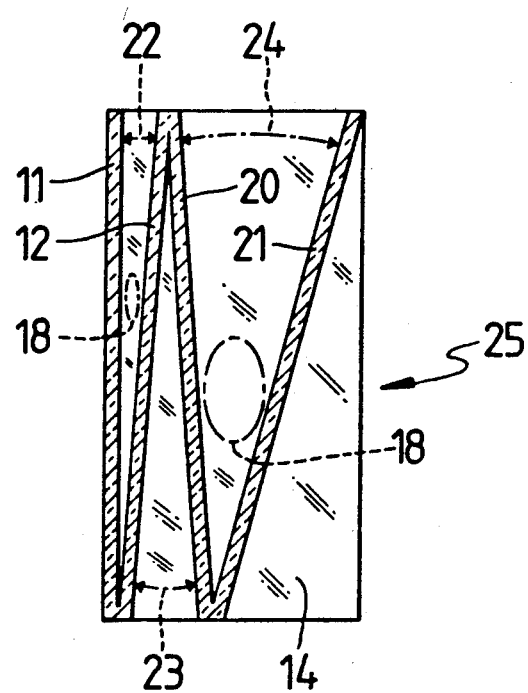
FIG. 4 is a sectional view taken along line 4—4 of FIG. 3.

An alternate embodiment as shown in FIG. 3 includes two convergent planar viewing members 11 and 12 integrally attached to an additional pair of convergent planar members 20 and 21. These members are attached to two end members 13 and 14. Unlike the wedged or V-shaped tank 10 depicted in FIG. 1, the W-shaped holding tank 25 does not utilize a base member 15. The lack of a base member 15 in this embodiment yields an article which through varying angles 22, 23 and 24 between the planar members provides three holding tanks capable of restraining fish of different sizes.

From the foregoing, it should be clear that the present invention and method represent a substantial improvement over the prior art.

While I have shown my invention in one form, it will be obvious to those skilled in the art that it is not so limited but is susceptible of various changes and modifications without departing from the spirit thereof.

What I claim is:

1. An article for restraining a live fish for observation and photographic purposes, comprising:
    (a) two convergent planar viewing members forming an upwardly opening wedge-shaped structure wherein a fish may be wedgingly engaged between said convergent planar viewing members;
    (b) two vertically oriented end members each having the ends of said upright opening wedge-shaped structure connected thereto; and
    (c) a rigid base member supporting said convergent planar viewing members and said end members.

2. An article as described in claim 1 wherein said article is constructed of a transparent durable material.

3. An article as defined in claim 2 wherein said durable transparent material is plexiglass.

4. An article as defined in claim 1 wherein said article further comprises means for securing said convergent planar viewing members, said end members and said base member to form a wedge-shaped tank.

5. An article as defined in claim 4 wherein said means for securing comprises an adhesive material permanently attaching said upright opening wedge-shaped structure in abutment with the surface of said end members and said base member.

6. An article as defined in claim 5 wherein said convergent planar viewing members are attached at an angle of less than 90 degrees such that said fish is immobilized by wedging engagement between said convergent planar viewing members.

7. An article for restraining fish for observation and photographic purposes comprising:
    (a) means for forming a trough to confine a fish in wedged engagement within a pair of downwardly converging surfaces;
    (b) means for sealing the ends of said trough to define a watertight enclosure; and
    (c) means for supporting said trough and sealing means in an upright position.

8. An article as defined in claim 7 wherein said means for forming comprises a pair of transparent planar members joined at a lower portion thereof to form said trough.

9. An article as defined in claim 8 wherein said transparent planar members are generally rectangular.

10. An article as defined in claim 9 wherein said article is constructed of a substantially durable material.

11. An article as defined in claim 7 wherein said means for sealing said trough to form said watertight enclosure comprises:
    (a) a non-toxic adhesive material; and
    (b) two end plates held in abutment to said trough by said adhesive material.

12. An article as defined in claim 7 wherein said means for supporting comprises a substantially rigid base member operatively connected to said means for forming and said means for sealing.

13. An article for restraining a live fish for observation and photographic purposes, comprising:
    (a) means for forming a tank having a W-shaped cross-section in order to confine said fish between a pair of downwardly converging planar surfaces; and
    (b) means for sealing the ends of said W-shaped tank to define three watertight enclosures.

14. An article as defined in claim 13 wherein said means for forming comprises two pair of said downwardly converging planar surfaces wherein the planar surfaces of each said pair are joined at a lower portion thereof, integrally connected to each other to form said W-shaped tank.

15. An article as defined in claim 13 wherein said converging planar surfaces are transparent.

16. An article as defined in claim 15 wherein said converging planar surfaces are generally rectangular.

17. An article as defined in claim 13 wherein said means for sealing comprises two end plates secured in sealed abutment with said W-shaped tank by an adhesive material.

18. An article as defined in claim 14 wherein said converging planar surfaces are joined at differing angles of less than 90 degrees such that fish of varying sizes may be immobilized by gravitational wedging of said fish between selected adjacent ones of said planar surfaces.

19. A method for restraining fish in a tank having two diverging planar viewing members, two vertical side members and a base member, all of which are adjoined through the use of a non-toxic adhesive material to form a wedge or V-shaped in cross-section tank used for visual display or photographic purposes, which comprises the steps of:
    (a) placing a fish specimen in the tank;

(b) allowing the fish specimen to settle in the tank, thereby wedging the fish specimen into the junction between the two planar viewing members; and (c) inverting the tank subsequent to said visual display or photography of said fish specimen to allow return of the fish specimen to its natural habitat.

20. A method as defined in claim 19 wherein said tank is filled with water to minimize stress on the fish specimen and to facilitate better visualization thereof.

* * * * *